United States Patent [19]
Ofner

[11] Patent Number: 5,967,126
[45] Date of Patent: Oct. 19, 1999

[54] INJECTION SYSTEM FOR AN INTERNAL COMBUSTION ENGINE OPERATED WITH LIQUEFIED PETROLEUM GAS

[75] Inventor: Herwig Ofner, Stübing, Austria

[73] Assignee: AVL List GmbH, Graz, Austria

[21] Appl. No.: 09/102,661

[22] Filed: Jun. 23, 1998

[30] Foreign Application Priority Data

Jun. 26, 1997 [AT] Austria ................................. 393/97 U

[51] Int. Cl.$^6$ ................................................. F02M 21/02
[52] U.S. Cl. ................................................. 123/525; 123/527
[58] Field of Search .................................. 123/446, 525, 123/527

[56] References Cited

U.S. PATENT DOCUMENTS

| | | | |
|---|---|---|---|
| 5,623,907 | 4/1997 | Cotton et al. | 123/525 |
| 5,690,078 | 11/1997 | Ofner | 123/527 |
| 5,832,906 | 11/1998 | Douville et al. | 123/527 |
| 5,857,448 | 1/1999 | Ofner et al. | 123/527 |
| 5,868,122 | 2/1999 | Gram et al. | 123/527 |

FOREIGN PATENT DOCUMENTS 19611434  12/1996  Germany .

*Primary Examiner*—Thomas N. Moulis
*Attorney, Agent, or Firm*—Watson Cole; Grindle Watson, P.L.L.C.

[57] ABSTRACT

The present invention relates to an injection system for an internal combustion engine operated with liquefied petroleum gas and with a plurality of injection nozzles for the direct injection of fuel into the cylinders of the internal combustion engine, which injection system comprises the following:

- a fuel supply system in which fuel is held under a gas pressure;
- a high-pressure pump in order to make fuel available which stands under injection pressure;
- a high-pressure line which is connected with the high-pressure pump in order to supply the fuel being under injection pressure to the injection nozzles.

A secure operation is achieved in such a way that a control line is provided further which can optionally be brought into connection with the injection nozzles, with fuel being present in the control line having a pressure which is higher than the gas pressure.

11 Claims, 2 Drawing Sheets

INJECTION SYSTEM FOR AN INTERNAL COMBUSTION ENGINE OPERATED WITH LIQUEFIED PETROLEUM GAS

FIELD OF THE INVENTION

The present invention relates to an injection system for an internal combustion engine operated with liquefied petroleum gas and with a plurality of injection nozzles for the direct injection of fuel into the cylinders of the internal combustion engine, which injection system comprises the following:

- a fuel supply system in which fuel is held under a gas pressure;
- a high-pressure pump in order to make fuel available which stands under injection pressure;
- a high-pressure line which is connected with the high-pressure pump in order to supply the fuel being under injection pressure to the injection nozzles.

PRIOR ART

Such an injection system exists in particular for the use of liquefied petroleum gas fuels with a high cetane number such as dimethylether which at ambient temperature has a vapour pressure of less than 30 bar and can be used as autogenous-igniting fuels. As a result of the high vapour pressure of such liquefied petroleum gases, the injection system must meet special requirements.

During the operation of such internal combustion engines it must be ensured that the formation of vapour bubbles does not occur in the injection nozzles, as otherwise the conveyance of fuel can no longer be secured. Moreover, special precautions must be taken in order to prevent any escape of fuel, particularly during the standstill of the internal combustion engine, as otherwise there might be danger of explosions. Under ambient conditions such fuels evaporate and can form an explosive mixture with air. From DE 196 11 434 A of the applicant an injection system for such fuels is known which is arranged according to the COMMON RAIL principle. In a common distributing rail for a cylinders of the internal combustion engine, fuel is guided under injection pressure, i.e. with approx. 200 to 250 bar, to the individual injection nozzles. The injection per se is controlled by way of solenoid valves. In order to avoid keeping the injection nozzles under injection pressure during periods in which there is no injection, the high-pressure connections of the injection nozzles are in connection with the supply line by way of a respective throttle. After ending the injection process the pressure in the injection nozzle can decrease from the injection pressure (200 to 250 bar) to gas pressure (approx. 10 bar). In this way sealing problems and the danger of any escape of fuel from the injection nozzles are prevented. It has been seen, however, that the fuel in the injection nozzles can evaporate under certain operational conditions, with the thus originating vapour bubbles causing a disturbance of the injection process.

SUMMARY OF THE INVENTION

It is the object of the present invention to avoid this disadvantage and to provide an injection system which ensures a secure operation in every respect. This means that on the one hand the escape of fuel is to be prevented reliably and that on the other hand cavitation effects or bubble formations in the injection nozzles are to be prevented securely.

These objects are achieved in accordance with the invention in such a way that furthermore a control line is provided which can optionally be brought in connection with the injection nozzles, with fuel being present in the control line with a pressure higher than the gas pressure.

The relevant aspect in the present invention is that a further pressure level is introduced between the gas pressure and the injection pressure. In this way the gas pressure can be kept at a relatively low level, e.g. at approx. 10 bar, and a high pressure level can still be maintained in the injection nozzles over periods in which there is no injection. A further advantage of the invention is that fuel is continuously conveyed through the control line, so that the control line per se acts as a means for cooling.

It is particularly favourable if the control line is supplied with fuel by a fuel pressure pump. It would principally be possible to gain the control pressure by throttling from the fuel high-pressure system. This, however, constitutes a relatively high stress on the fuel pressure pump and requires a relative large expenditure of energy. By providing a separate fuel pressure pump which produces a control pressure of preferably 20 to 40 bar and particularly preferably of 25 to 35 bar, the control pressure can be obtained with a relatively low use of energy. Moreover, the heating of the fuel by the fuel pressure pump is minimal.

In a particularly preferable embodiment of the present invention it is provided that the high-pressure line, the control line and a circulation line being under gas pressure are arranged in a common component. The distributing rail which contains the fuel high-pressure line is used in this arrangement like a heat exchanger, as the fuel in the supply line and in the control line has a lower temperature than the fuel in the high-pressure line. In this way fuel is supplied at a lower temperature to the injection nozzles for injection, so that their thermal stress is reduced. The danger of formation of bubbles is thus further reduced.

It can be provided that a device is provided in the control line in order to operatively adjust the control pressure. The adjustment of the control pressure can occur depending on the temperature of the injection nozzles or other parameters, for example. In this way it can be achieved that the control pressure is only so high that an evaporation of fuel in the injection nozzles can be securely prevented.

In a preferable embodiment of the invention it is provided that a three-way valve is provided for each injection nozzle, which three-way valve is in connection with the high-pressure line, the control line and the fuel supply connection of the injection nozzle and which in a first position connects the high-pressure line with the fuel supply connection of the injection nozzle and in a second position connects the control line with the fuel supply connection of the injection nozzle. In this way the high-pressure connection of the injection nozzles is only charged with high-pressure fuel during the injection. Otherwise, a connection with the control line is produced. The high-pressure connection is then blocked.

As an alternative it can be provided that an injection control valve is provided for each injection nozzle, which valve is arranged between the high-pressure line and the fuel supply connection of the injection nozzle, and that a throttle is arranged between the fuel supply connection of each injection nozzle and the control line. During the injection process the injection control valve opens, so that the injection nozzle is in direct connection with the high-pressure line. The throttle prevents an excessive pressure drop by the discharge of fuel into the control line. The injection process is ended in such a way that the injection control valve closes. The injection pressure in the fuel injection nozzle can decrease via a throttle in the control line. After the end of the injection process the fuel is held in the injection nozzle under control pressure.

SHORT DESCRIPTION OF THE DRAWINGS

The invention is now explained in closer detail by reference to the embodiments shown in the figures. FIG. 1 shows a first embodiment of the present invention and FIG. 2 shows a detail of another embodiment of the invention.

DETAILED DESCRIPTION OF THE PREFERRED EMBODIMENTS OF THE INVENTION

Figure 1:
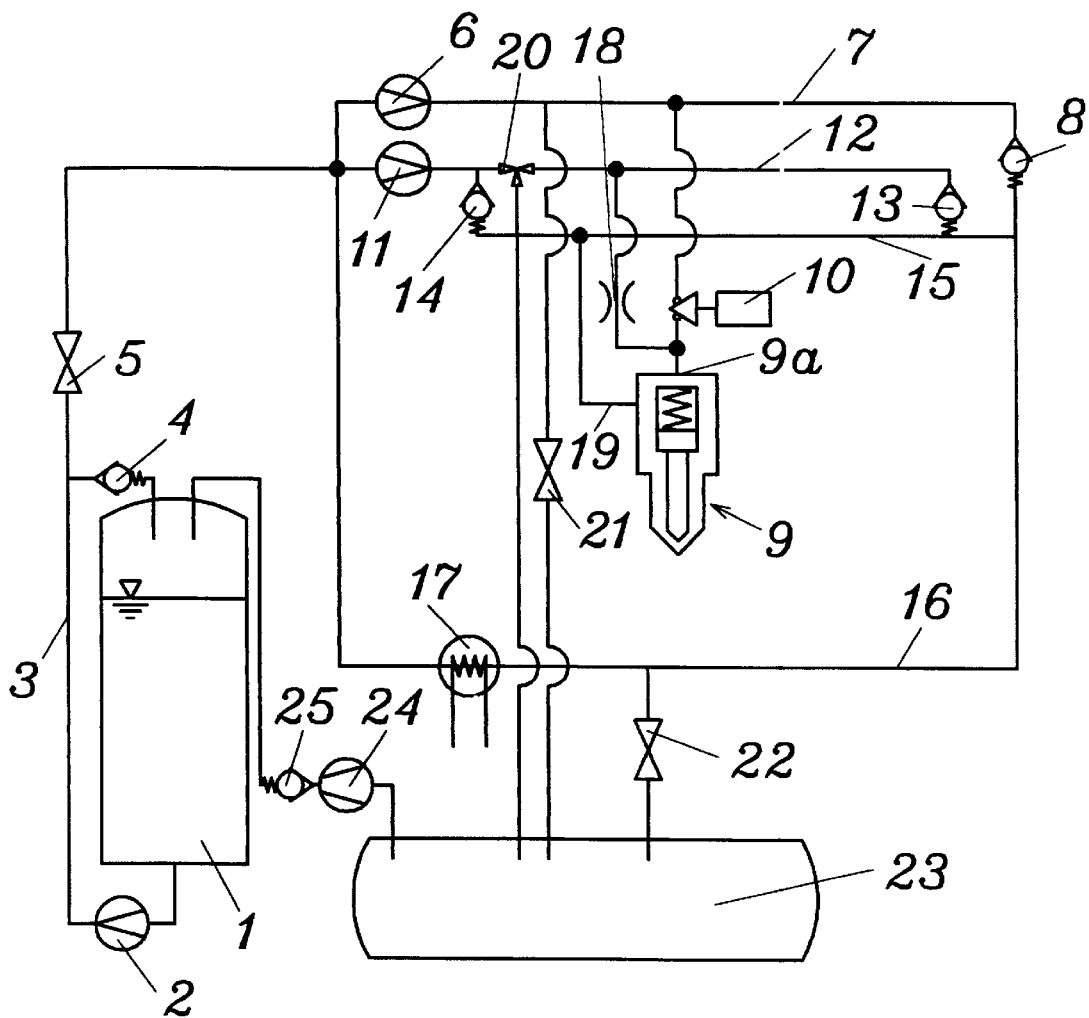

In the embodiment of FIG. 1 fuel is present in a fuel tank 1. A fuel low-pressure pump 2 conveys fuel to a supply line 3 which is kept at a pressure of approx. 10 bar by way of a pressure control valve. A control valve 5 allows regulating the fuel supply. A fuel high-pressure pump 6 conveys fuel to a fuel high-pressure line 7 in which the fuel is present with a pressure of approx. 200 bar. A pressure control valve 8 regulates this fuel pressure, which simultaneously represents the injection pressure. FIG. 1 shows in an exemplary manner a single injection nozzle 9. It is clear, however, that several such injection nozzles 9 are arranged next to one another according to the number of the cylinders of the internal combustion engine. An injection control valve 10, which is arranged as an electromagnetically actuatable valve, is provided for each injection nozzle 9. During the injection process this injection control valve 10 opens in order to supply the fuel supply connection 9a of the injection nozzle 9 with fuel under injection pressure. Moreover, a fuel pressure pump 11 is in connection with the supply line 3, which pump supplies a control line 12 with fuel which is under a pressure of approx. 30 bar. A pressure control valve 13 is used for setting the control pressure. Optionally, the pressure control valve 13 can be arranged in a controllable way so as to enable setting the control pressure according to the respectively given requirements. A further pressure control valve 14 is used for supplying a circulation line 15 with fuel. The circulation line 15 is in connection with a return line 16 in which a fuel cooler 17 is arranged. Downstream of the cooler 17 the return line 16 opens into the supply line 3.

The fuel supply connection 9a of the injection nozzle 9 is in connection with the control line 12 by way of a throttle 18. The pressure in the injection nozzle 9 can be reduced to the control pressure by way of the throttle 18 during periods in which there is no injection. A relief line 19 of the fuel injection nozzle 9 is in connection with the circulation line 15.

A three-way valve 20 is used on the one hand for the regulation of the fuel throughput in the control line 12 and in the circulation line 15 and on the other hand for enabling the pressure in the control line 12 to bleed off during the standstill of the internal combustion engine. A drain valve 21 is used for the pressure reduction in the high-pressure line 7 and a drain valve 22 is used for pressure reduction in return line 16. As a result of these valves 20, 21, 22 it is therefore possible to make the entire fuel system pressureless on turning off the internal combustion engine. The fuel is bled off from these valves 20, 21, 22 to a purge tank, i.e. a pressureless storage means 23. Fuel from this tank 23 is returned to the store tank by way of a fuel low-pressure pump 24 and a return valve 25.

The fuel lines 7, 12 and 15 are arranged as bores in a common distributing rail. In this way an intensive exchange of temperature is possible between the fuel present in the high-pressure line 7 and the fuel present in the control line 12 and the circulation line 15. As a result, the fuel heated by the fuel high-pressure pump 6 is cooled effectively. It would principally be possible to return the fuel from the return line 16 directly to the store tank 1 in order to achieve a thorough mixture with the fuel present there.

By providing the cooler 17 the fuel from the return line 16 can be cooled effectively and can be supplied directly to high-pressure pump 6 or medium-pressure pump 11. The conveyed quantity of the fuel medium-pressure pump 11 is chosen in such a way that the fuel is conveyed in excess into the control line 12. As a result of the respective adjustment of the pressure control valves 13 and 14 a permanent flow through the circulation line 15 is achieved in the same way. In this way the cooling of the entire system can be intensified.

Figure 2:
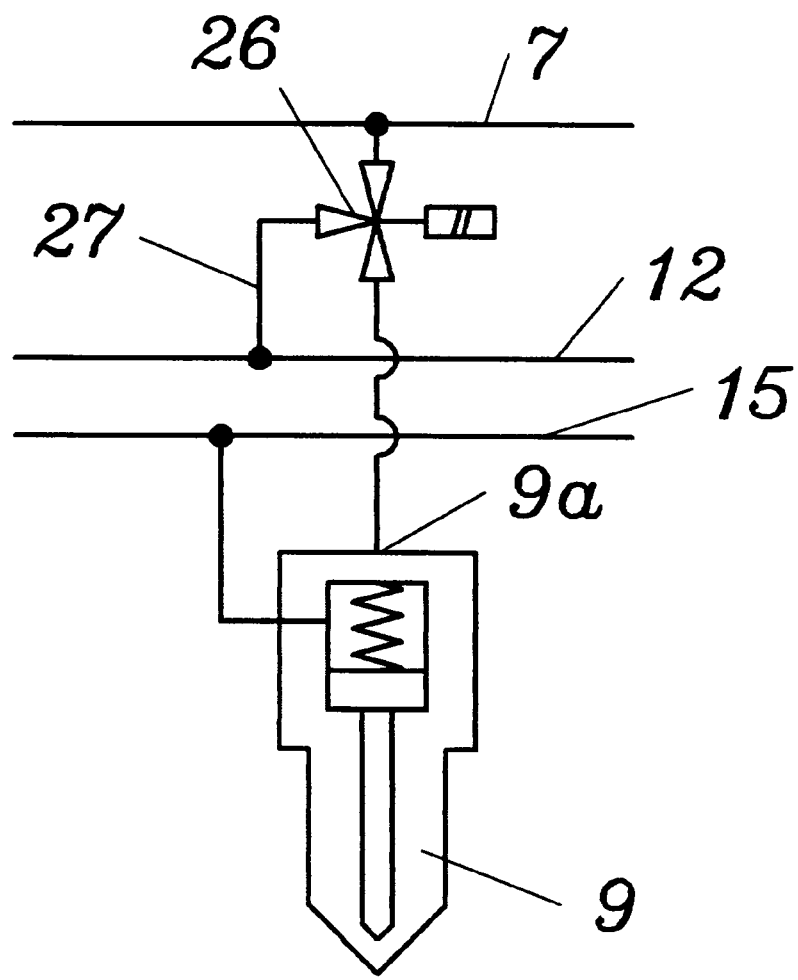

FIG. 2 shows a detail of an alternative injection system. FIG. 2 only shows the zone of an injection nozzle 9. The remaining injection system is similar to the one in FIG. 1. An electromagnetically actuated three-way valve 26 controls the connection between the fuel high-pressure line 7 and the fuel supply connection 9a of the injection nozzle 9. During the fuel injection process the connection of the connection 9a with the fuel high-pressure line 7 is produced. A connecting line 27 which communicates with the control line 12 is blocked in this process. In the other position of the three-way valve 26 a connection is produced via the connecting line 27 between the control line 12 with the fuel supply connection 9a of the injection nozzle 9. The pressure within the injection nozzle 9 thus falls to the control pressure. The connection of the valve 26 which is connected with the fuel high-pressure line 7 is blocked in this process.

FIGS. 1 and 2 do not show the leakage system for the purpose of simplifying the representation, which system is arranged in the known manner. The leakage system concerns a number of lines which are directly in connection with the storage means 23 and ensure a pressure relief for various gaskets and the like.

The present invention allows providing a fuel injection system for fuels with a high vapour pressure in which the occurrence of vapour bubbles at critical places is securely prevented. This object is achieved in the present invention in such a way that, on the one hand, the idle pressure is kept above the gas pressure in the injection nozzles and, on the other hand, that an improved cooling of the injection system is achieved by an increased fuel circulation.

I claim:

1. An injection system for an internal combustion engine operated with liquefied petroleum gas and with a plurality of injection nozzles for direct injection of fuel into the cylinders of the internal combustion engine, which injection system comprises:

a fuel supply system in which fuel is held under a gas pressure;

a high-pressure pump in order to make fuel available which stands under injection pressure;

a high-pressure line which is connected with the high-pressure pump in order to supply the fuel being under injection pressure to the injection nozzles, characterized in that a control line is provided further which can optionally be brought into connection with the injection nozzles, with fuel being present in the control line having a pressure which is higher than the gas pressure.

2. An injection system as claimed in claim 1, characterized in that the control line is supplied with fuel by a fuel pressure pump.

3. An injection system as claimed in claim 1, characterized in that a return line which is under gas pressure is provided and that a fuel cooler is provided in said return line.

4. An injection system as claimed in claim 1, characterized in that the control line is arranged for cooling, so that fuel is present in the control line with a lower temperature than in the high-pressure line.

5. An injection system as claimed in claim 1, characterized in that the high-pressure line, the control line and a circulation line being under gas pressure are arranged in a joint component.

6. An injection system as claimed in claim 1, characterized in that at least one pressure control valve is arranged in the control line, which valve sets the control pressure to a value of between 20 and 40 bar.

7. An injection system as claimed in claim 1, characterized in that at least one pressure control valve is arranged in the control line, which valve sets the control pressure to a value of between 25 and 35 bar.

8. An injection system as claimed in claim 1, characterized in that a device is provided in the control line in order to enable the operative adjustment of the control pressure.

9. An injection system as claimed in claim 1, characterized in that a three-way valve is provided for each injection nozzle, which valve is in connection with the high-pressure line, the control line and a fuel supply connection of the injection nozzle and which in a first position connects the high-pressure line with the fuel supply connection of the injection nozzle and which in a second position connects the control line with the fuel supply connection of the injection nozzle.

10. An injection system as claimed in claim 1, characterized in that an injection control valve is provided for each injection nozzle, which valve is arranged between the high-pressure line and a fuel supply connection of the injection nozzle and that a throttle is arranged between the fuel supply connection of each injection nozzle and the control line.

11. An injection system as claimed in claim 1, characterized in that a leakage line is further provided in which fuel is present at or slightly above ambient pressure.

* * * * *